March 22, 1960 F. H. SHEPARD, JR 2,929,942
SQUARE PULSE GENERATOR
Filed March 6, 1953
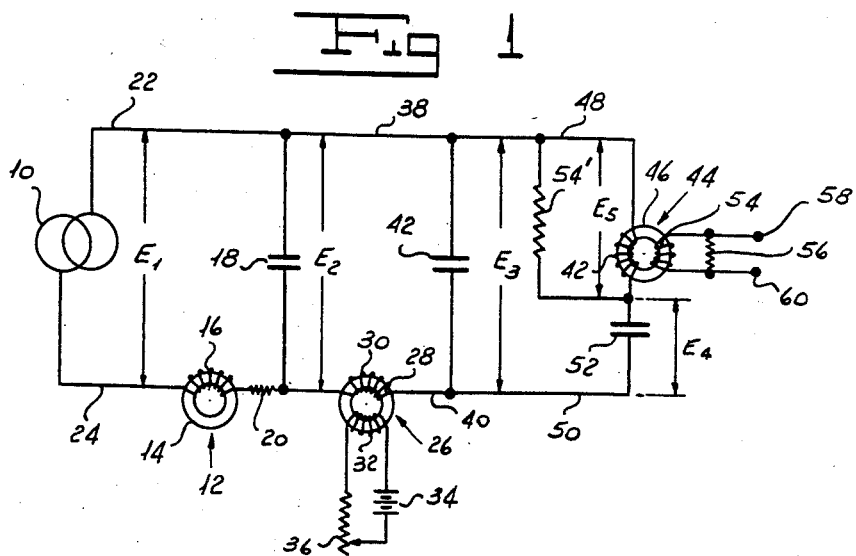
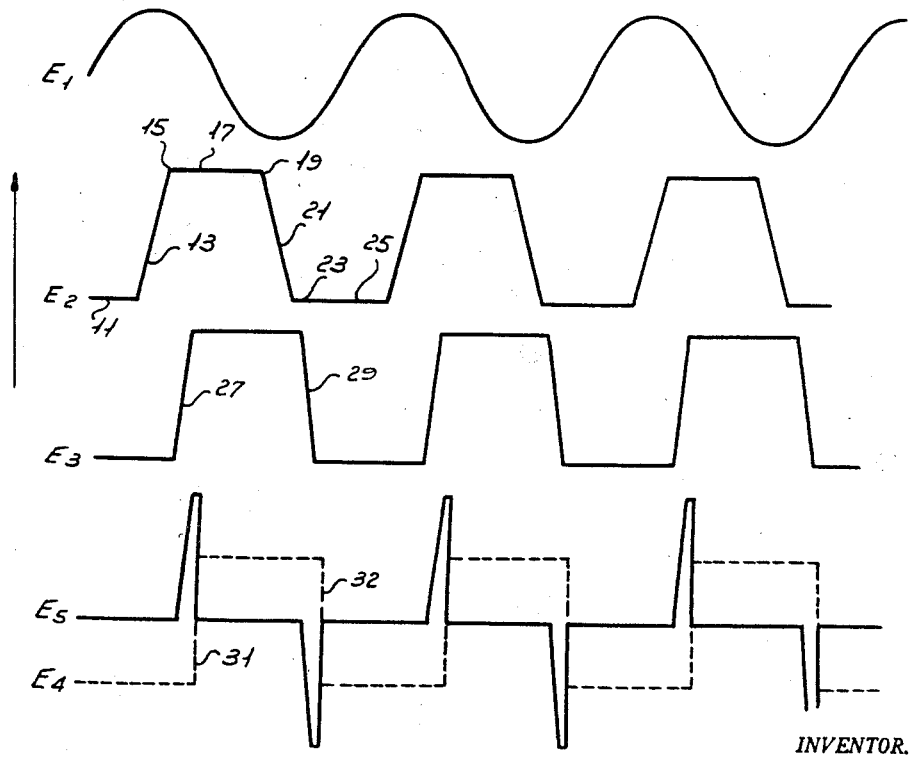
INVENTOR.
FRANCIS H. SHEPARD JR.
BY
Harry L. Shewier
ATTORNEY

United States Patent Office 2,929,942
Patented Mar. 22, 1960

2,929,942

SQUARE PULSE GENERATOR

Francis H. Shepard, Jr., Madison, N.J.

Application March 6, 1953, Serial No. 340,746

6 Claims. (Cl. 307—106)

My invention relates to a square pulse generator and more particularly to a means for generating substantially square pulses for use in keying high power transmitters, for controlling delay in radar and other electronic applications and the like, without the use of vacuum tubes.

Square pulse generators of the prior art for generating gating pulses and the like employ vacuum tubes. Most commonly a hard thermionic tube is arranged to be keyed on and off by multivibrators or delay lines. Thyratrons are sometimes used in combination with delay lines. These means are expensive to construct, difficult to adjust, complex and cumbersome in operation and frequently unreliable.

One object of my invention is to provide a square pulse generator which is inexpensive to construct and simple and reliable in operation.

Another object of my invention is to provide a square pulse generator which employs no vacuum tubes.

Another object of my invention is to provide a generator for square pulses of controlled duration.

A further object of my invention is to provide a square pulse generator in which the delay time or time of occurrence of the pulses may be readily, simply and expeditiously varied.

Another object of my invention is to provide a square pulse generator employing saturable core reactors.

Other objects of my invention will appear from the following description.

In the accompanying drawings which form part of the instant specification and which are to be read in conjunction therewith:

Figure 1 is a diagrammatic view showing a circuit containing one embodiment of my invention.

Figure 2 is a series of curves showing the voltage-time relationships at various parts of the circuit shown in Figure 1.

For ease in understanding my invention let us consider for purposes of explanation that a choke coil having a saturable core presents an infinite impedance to the passage of electrical current before saturation is reached, and then presents a negligible impedance after saturation is reached. The flux in the core is a function of the product of current, the number of turns in the coil about the core, and the reciprocal of the reluctance of the core. The voltage generated across the coil is proportional to the rate of change of flux. Stated differently, neglecting the resistance of the winding, if a fixed voltage is applied to the coil the rate of change of flux will be constant or have a fixed slope until saturation is reached. We see, therefore, that the voltage across the coil is proportional to the rate of change of flux which in turn is proportional to ampere turns times permeability for a given unit of cross section of the core.

Referring now to Figure 1, a source of an alternating potential 10 is connected across a choke coil indicated generally by the reference numeral 12 having a core 14 and a winding 16 by a capacitor 18 and a damping resistor 20. The curve $E_1$ of Figure 2 represents the voltage across the conductors 22 and 24 which is impressed across the condenser 18 in series with the winding 16 of the choke coil 12. It is to be understood that any source of an oscillating or pulsing voltage may be employed as the source of alternating potential 10. For example, if desired the voltage may be supplied by a thyratron.

Referring now to the curve $E_2$ of Figure 2, let us assume that the core is unsaturated and condenser 18 is charged in the negative direction, as shown by the portion 11 of the curve $E_2$. As the voltage $E_1$ changes in the positive direction at some point, depending upon the voltage time characteristics and the condition of initial magnetization of the core, the flux will build up in a positive direction to saturation, whereupon, as shown by the portion 13 of the curve $E_2$, capacitor 18 will be charged in the opposite direction. The slope of the portion 13 is, as we have seen above, determined by the saturate inductance of the core, the size of capacitor 18 and the value of the damping resistor 20, the resistance of reactor 12 and the series resistance of the capacitor 18. Thus, after saturation is reached, the choke coil presenting a negligible impedance, permits current to flow at a high rate to charge the capacitor 18.

Referring again to Figure 1, we see a second choke coil indicated generally by the reference numeral 26 having a core 28, a first winding 30 and a second winding 32. The second winding is connected across a source of potential 34 such as a battery and a variable resistor 36 adapted to change the premagnetizing current flowing through coil 32. Depending on the polarity of the battery it will be clear that we may premagnetize the core 28 in one direction or the other to shorten the build-up time in one direction or the other before saturation, thus shortening the delay time in one direction or the other. While for purposes of convenience we have shown in Figure 2 the peak 15 of the voltage curve $E_2$ occurring slightly after the time the voltage $E_1$ reaches its peak, it is to be understood that the saturation at 15 may occur before, coincident with, or after the time the voltage $E_1$ reaches its peak, depending upon the characteristics of the core and the voltage applied.

Again referring to Figure 2, it will be seen that while the core is unsaturated and the condenser is charged in one direction, as indicated by the portion 17 of the curve $E_2$, negligible change in voltage will occur. As the applied voltage $E_1$ changes direction a point 19 is reached at which the core becomes saturated in the positive direction and the applied voltage charges the condenser 18 in the opposite direction. This is shown by the portion 21 of the curve $E_2$. During the time there is a change in magnetization there is, of course, a change in flux and hence a change in voltage, as shown by the difference between curve $E_2$ and curve $E_1$.

The voltage pulses across capacitor 18 are impressed across the choke coil 26 in series with condenser 42 by means of conductors 38 and 40. In a manner described with reference to the generation of curve $E_2$, the curve $E_3$ of Figure 2 showing the voltages across the capacitor 42 will be generated. It will be seen that the curve $E_3$ is generally similar to the curve $E_2$ except that the slopes of the portions 27 and 29 of the curve $E_3$ are much steeper, owing to a more rapid fluctuation in the voltage from the positive to the negative direction and vice versa. The voltage $E_3$ is impressed across the winding 42 of a third choke coil indicated generally by the reference numeral 44 having a core 46 through conductors 48 and 50 and a capacitor 52. The voltage across this capacitor is indicated by the reference character $E_4$ and a curve of this voltage against time is shown in dotted lines in Figure 2. It will be seen that this curve is generally similar to curves $E_2$ and $E_3$ except that the rise time in the voltage is greatly lessened. That is, the slope of the portion 31 and the slope of the portion 32 of the curve are much steeper. In actual practice the rise time can be made to be a fraction of a microsecond by proper parameters.

The resistor 54' is shunted across the coil 42 to damp transients. The voltage across the resistor and hence the coil is represented by the difference voltage between voltage $E_3$ and voltage $E_4$. This difference voltage $E_5$ is plotted against time in Figure 2 and it will be seen that it takes the form of a series of pulses the slope of one side of which is the rise time of the voltage $E_3$ in one direction, and the slope of the other side of which is the collapse time of the voltage $E_4$ in the opposite direction. If the circuits are not critically damped the amplitude of voltage $E_2$ will be higher than $E_1$ and the voltage $E_3$ will be higher than the voltage $E_4$. The series of sharp voltage pulses are substantially square waves which it is the object of the invention to generate. It is to be understood that even after saturation there will be a slight change in flux due to the fact that the windings will be supplied with the equivalent of an air core. This effect is minor and has been neglected in the description but will be appreciated by those skilled in the art. Stated quite simply, after saturation, for example, the portion 17 of the curve $E_2$ will not be level but will rise at a very slow rate with respect to time due to the current flow through the winding 16 considering that the winding has an air core. This phenomenon is inherent and does not affect the operation of my pulse generator. The voltage amplitude of the pulses is multiplied by the secondary winding 54 of which the winding 42 is the primary. The resistor 56 is shunted across the secondary winding and tends to damp the transients. The output of the generator is removed through terminals 58 and 60.

The time of the pulses is inversely proportional to the applied voltage and directly proportional to the number of turns in the coil as well as directly proportional to the cross-sectional area of the core and directly proportional to the flux density at saturation. It will be seen, therefore, that by changing the applied voltage or the number of turns or the cross-sectional area of the core or the flux density at saturation, we can change the timing of pulses to meet any given requirement within appropriate limits.

It will be seen that I have accomplished the objects of my invention. I have provided a square pulse generator which is inexpensive to construct, which is simple and reliable in operation and which employs no vacuum tubes. I have provided a generator for square pulses of controlled duration. I have provided a square pulse generator in which the time of the occurrence of the pulse may be readily, rapidly and simply varied. My square pulse generator employs saturable core reactors instead of thermionic tubes.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A square pulse generator including in combination a source of alternating potential, a first capacitor, a first saturable core reactor having a winding connected in series with said first capacitor, means for impressing the alternating potential across the series-connected winding and capacitor, a second capacitor, a second saturable core reactor having a winding connected in series with said second capacitor, means for impressing the charge of the first capacitor across the series-connected second saturable core reactor winding and said second capacitor, the voltage pulses across said second saturable core reactor winding being the desired square pulses.

2. In a square pulse generator as in claim 1, a second winding positioned about said first saturable core reactor, means for passing a unidirectional current through said second winding to premagnetize the first saturable core reactor in a predetermined direction and to a predetermined extent.

3. In a square pulse generator as in claim 1, a second winding positioned about said second saturable core, said second winding acting as a secondary winding of a transformer to the first winding about said second saturable core reactor which thus constitutes the primary winding of a transformer and means for removing the voltage across the secondary transformer winding as the desired square pulses.

4. A square pulse generator as in claim 1, in which said source of alternating potential comprises an alternator, a third capacitor, a third saturable core reactor having a winding connected in series with said third capacitor, means for impressing the output of the alternator across said series-connected third capacitor and winding of said third saturable core reactor, the voltage across said third capacitor forming the source of the alternating potential.

5. In a square pulse generator as in claim 1, a resistor and means for shunting said resistor across the winding of said second saturable core reactor to damp transients.

6. In a square pulse generator as in claim 1, a resistor, means for shunting said resistor across the winding of said second saturable core reactor to damp transients, a second winding positioned about the core of said second saturable core reactor, said second winding acting as a secondary winding of a transformer of which the first winding of said second saturable core reactor is the primary, a second resistor and means for connecting said second resistor across said second winding of said saturable core reactor to damp transients.

References Cited in the file of this patent

UNITED STATES PATENTS

| | | |
|---|---|---|
| 1,501,569 | Osnos | July 15, 1924 |
| 1,921,787 | Suits | Aug. 8, 1933 |
| 1,921,789 | Suits | Aug. 8, 1933 |
| 2,040,677 | Suits | May 12, 1936 |
| 2,758,221 | Williams | Aug. 7, 1956 |

FOREIGN PATENTS

| | | |
|---|---|---|
| 154,760 | Australia | Jan. 14, 1954 |